April 30, 1957 R. I. HAUSER 2,790,618
FRONT CLAMP FOR AIRCRAFT ELECTRONIC APPARATUS MOUNTING BASE
Filed June 10, 1955
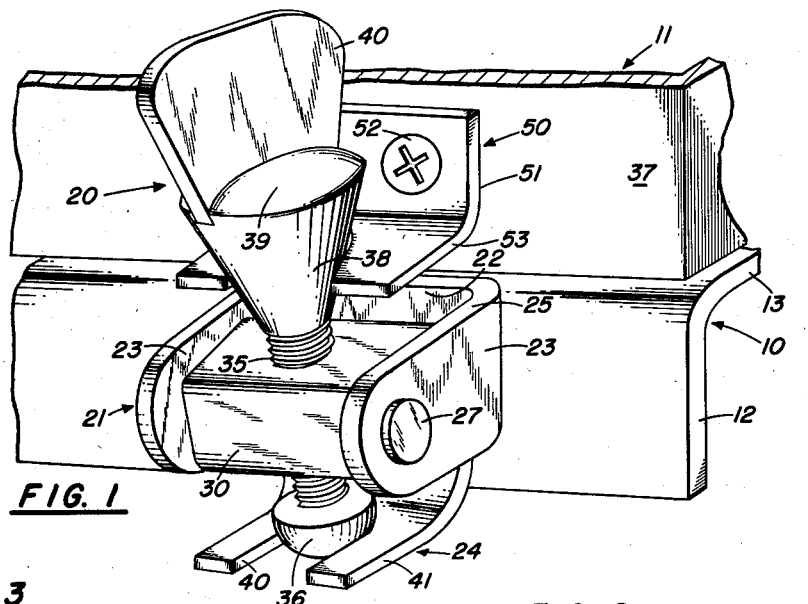
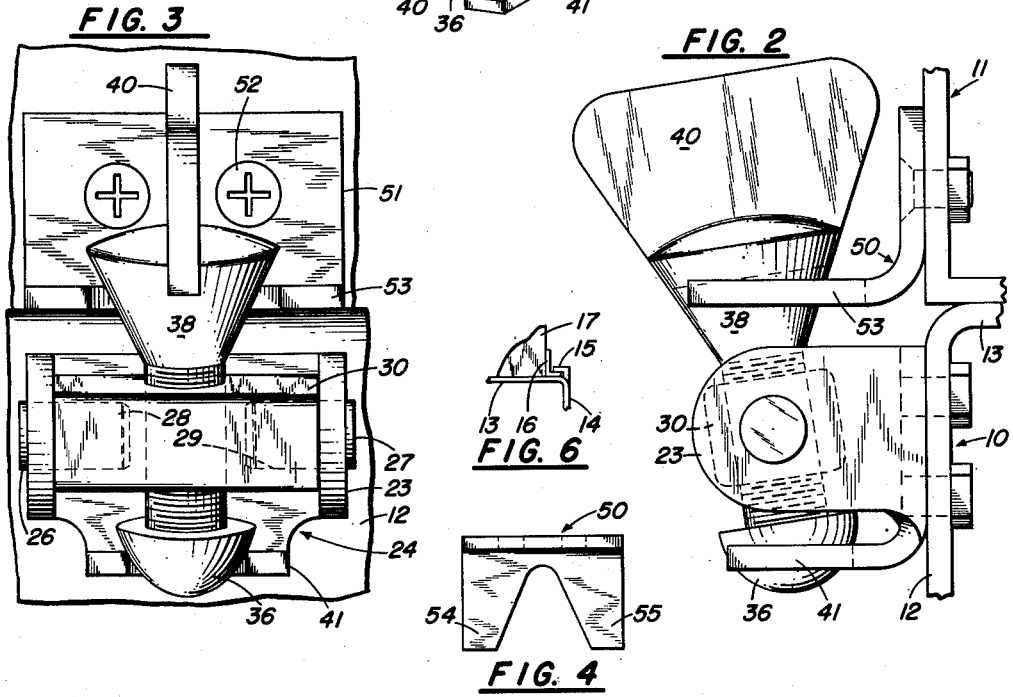
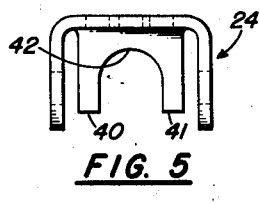
INVENTOR
RALPH I. HAUSER
BY
ATTORNEYS

United States Patent Office 2,790,618
Patented Apr. 30, 1957

2,790,618

FRONT CLAMP FOR AIRCRAFT ELECTRONIC APPARATUS MOUNTING BASE

Ralph I. Hauser, Baltimore, Md., assignor, by mesne assignments, to the United States of America as represented by the Secretary of the Navy Application June 10, 1955, Serial No. 514,794

8 Claims. (Cl. 248—361)

This invention relates to clamps for supporting apparatus containers, particularly containers mounted along narrow passageways where protruding parts afford chance of injury, as in aircraft use.

In military aircraft, electronic apparatus is frequently cased and placed on a base positioned along a narrow aisle where it is accessible for operation or servicing. These casings are usually provided at the bottom of the rear side with a horizontal lip, which is slipped into a grooved holder mounted on the base, there being a horizontal lip, also, on the lower front side of the casing engageable with a clamp swingably mounted on the front side of the base. A disadvantage of these prior casing attachments lies in the fact that the clamp, in order to ride over the front lip for attachment must pivot outwardly to such an extent as to form an undesirable obstruction. Another disadvantage results from the necessity, usually, of providing an opening in the base for the clamp bolt, this resulting in undesirable complication in the base structure. Usually, also, in these prior devices there must be careful spacing between the clamp parts in order to obtain an effective grip.

Generally stated, the invention consists in a clamping device having a pivoted bolt provided with camming elements at each end, the bolt being axially movable to force separable objects into close proximity by camming action.

The objects of the invention, therefore, include provision of a pivoted clamp construction which permits approximately vertical positioning of the movable clamp element in either open or closed position; which, when applied to a movable casing restrains movement of the casing in all directions; which, when applied to a casing with a rear lip and groove attachment, forces the lip into the groove on clamp tightening; and which does not require close preliminary spacing between the clamp parts.

Other objects and many of the attendant advantages of this invention will be readily appreciated as the same becomes better understood by reference to the following detailed description when considered in connection with the accompanying drawings wherein:

Fig. 1 is a perspective view of the locked clamp showing sections of the base and apparatus casing;

Fig. 2 is a side view of the clamp in locked position;

Fig. 3 is a front view of the locked clamp;

Fig. 4 is a plan view of the casing attached cam bracket;

Fig. 5 is a plan view of the base attached cam bracket; and

Fig. 6 is a detail showing the lip and groove separable fastener at the rear of the casing.

The base 10 for supporting the apparatus casing 11, is shown in Figs. 1, 2, 3 and 6, as in sheet form, with a front vertical section 12, a horizontal section 13 and a rear vertical section 14. The rear base edge is provided with a forwardly extending hook 15, forming a groove into which the lip 16 of a bracket attached to the bottom edge of the rear side 17 of the casing 11 may be moved.

The clamp 20 is attached for operation on the front panel section 12 of the base. A U-shaped support bracket 21 having a base section 22, side section 23 and cam section 24 is suitably attached to the side plate 12 near its junction with the top base plate 13, so that the top edge 25 of the bracket lies approximately in the plane of the top base surface. The bracket sections 23 are rounded at their ends and single apertured at opposed horizontal points to receive the cylindrical pivot studs 26 and 27. These studs enter cylindrical recesses 28 and 29 formed in opposite sides of a bolt receiving block 30 and, centrally of this block, a screw threaded transverse opening is formed adapted to receive the threaded clamp bolt 35. This bolt is terminated at the locked lower end with hemispherical cap 36 and at the locked upper end with a cone-shaped head 38 of such length as to extend appreciably above and below the plane of the upper base surface and opposite the lower section of the front wall 37 of casing 11. A slot extends across the head base 39 in which a flat finger-piece plate 40 is fixed.

The cam section 24 of the bracket 21 projects outwardly, from the bottom edge of base section 22 directly beneath block 30 and is formed with side fingers 40 and 41 (see Fig. 5) to define a U-shaped opening with a circular base 42 adapted to underlie the bolt cap 36 when the bolt is in the upright position of Fig. 1.

A cam plate 50 is attached also to the apparatus casing. This plate is L-shaped with a base section 51 secured to the casing, as by screws 52, at a point directly above the bracket 21 and behind bolt head 38 when the bolt is in the upright position of Fig. 1. The other section 53 of cam plate 50 is bifurcated, substantially in V-form, to form outwardly projecting fingers 54 and 55 (see Fig. 4), the base of the V being rounded.

It will now be apparent that the cone shaped head 38 of bolt 35 is adapted to engage the cam edges of fingers 54 and 55, the divergence of the fingers permitting adjustment thereof to that part of the cone which may be opposite as determined by screw adjustment of the bolt. It is, also, evident that the hemispherical cap 36 of the bolt nests against the circular base 42 of cam section 24 when the bolt is screwed downwardly thereagainst.

In use, assume the apparatus casing 37 in position on the base 10 with the rear casing lip inserted in the retaining groove 15 and the cam plate 50 overlying the block 30 of the clamp directly behind the bolt cone 38. In this position, rotation of the bolt on its axis to produce downward movement thereof will force the bolt cap 36 against the circular recess of cam plate 24 and cause it to exert outward leverage on the lower bolt end. Since the bolt is pivotally mounted on pins 26 and 27 through block 30, the upper bolt end will move into the cam recess of plate 52, and, on contact with the cam edges of the recess by cone head 38, will force the casing rearwardly to obtain tight engagement of the rear lip and groove fastener. At the same time the head exerts a downward force component against the cam plate 50 which moves the casing tightly against the base. In addition the head-cam grip is such as to resist side sliding of the casing, and, consequently, the casing is held immobile from all movement.

On release of the bolt, by reverse rotation thereof, the bolt cap 36 rides out of its cam recess and the bolt top pivots outwardly releasing the head 38 from the cam plate 52. When the cap moves clear of the cam fingers 40, 41, the bolt swings down with head 38 below and the cap 36 above, so that in either locked or unlocked position, there is no undesirable projection of the clamp into the aisle area beside the clamp.

It is pointed out that the screw-cam fastener does not require exact spacing of the casing camming bracket section 53 from the top edge of bolt bracket 21, the conical head 38 adjusting for any casing bracket position within the cone limits. Because of this construction it is possible to change casings without disturbing the proper action of the clamping device. Also, the described clamp operation slides the casing lip 16 into the groove 15 in case the attendant fails to nest these parts properly.

Obviously many modifications and variations of the present invention are possible in the light of the above teachings. It is therefore to be understood that within the scope of the appended claims the invention may be practiced otherwise than as specifically described.

What is claimed is:

1. A clamp device for attaching together two objects having adjoining coplanar surfaces, comprising a support bracket mounted on one of said surfaces contiguous to the other surface, a bolt pivotally mounted on said bracket and alined approximately at right angles to the line of surface junction, said bolt having at one end a cone shaped head adapted to overlie said other surface and at the other end a cap having a spherical contour, an approximately V-shaped cam bracket attached to said other surface at a point adjacent said surface junction and at an angle adapted to receive said head when in clamping position, a cam bracket secured to said one surface having an outwardly projecting cam plate provided with an approximately circular cam sector adapted to engage said bolt cap when the bolt is in clamping position, and means for moving said bolt cap axially into and out of engagement with said circular cap sector, whereby the bolt head is brought into camming engagement with said V-shaped cam.

2. The clamp device as defined in claim 1 and fastener means attached between said objects at a point displaced from said clamp device.

3. A clamp device for attaching together two objects having adjoining coplanar surfaces, comprising a bracket having an outwardly exposed camming surface mounted on one of said coplanar surfaces adjacent the coplanar surface junction, a bracket having an outwardly exposed caming surface mounted on the other coplanar surface adjoining the coplanar surface junction, a bracket having a camming bolt pivotally mounted thereon, said bolt bracket being attached to one of said object surfaces between the camming surface brackets in position for the camming bolt to engage said camming surfaces, cam elements secured to the ends of said bolt, and means for moving said bolt cam elements into and out of engagement with said camming surfaces.

4. The clamp device as defined in claim 3, and additional attachment means between said objects at a point displaced from said camming brackets and in the plane of movement of said camming bolt.

5. Separable fastener apparatus for attachment of an object to a flat base having a right angled side panel comprising a cam bracket secured to the base panel provided with a camming surface, a cam bracket secured to said object provided with a camming surface, a pivoted bolt having end camming elements thereon mounted on said base panel between said cam brackets, and means for moving said bolt into and out of engagement with said camming brackets, the camming elements of said bolt including a camming surface adjacent the object end of the bolt and angularly inclined toward the bolt axis and away from the bolt end, whereby, on axial movement of said bolt toward said base, the action of the camming surface adjacent the object end of the bolt is used to force said object toward said base and away from said brackets.

6. The separable fastener apparatus as defined in claim 5, and a stop mounted on said base on the side of said object opposite from said cam brackets, whereby sliding movement of said object away from the cam brackets is prevented.

7. The separable fastener apparatus as defined in claim 5, and a separable lip-groove connection between the base and object secured to these parts at a point displaced from the cam brackets in the direction of camming action thereof.

8. The clamp device as defined in claim 5, the camming surface of said base bracket being circular in contour, the camming surface of said object bracket being V-shaped, the bolt camming element adjacent the base bracket being convexly spherical in contour, and the bolt camming element adjacent the object bracket being convexly conical in contour, said bolt camming elements being in axial alinement with said bolt and said conical surface being inclined inwardly from the bolt end toward the bolt axis.

References Cited in the file of this patent

UNITED STATES PATENTS

| 2,630,996 | Lauther | Mar. 10, 1953 |
| 2,728,552 | Fate | Dec. 27, 1955 |